INVENTOR.
CHARLES A. BOYD
HERBERT KARTLUKE
BY Seidel & Gonda

ATTORNEYS.

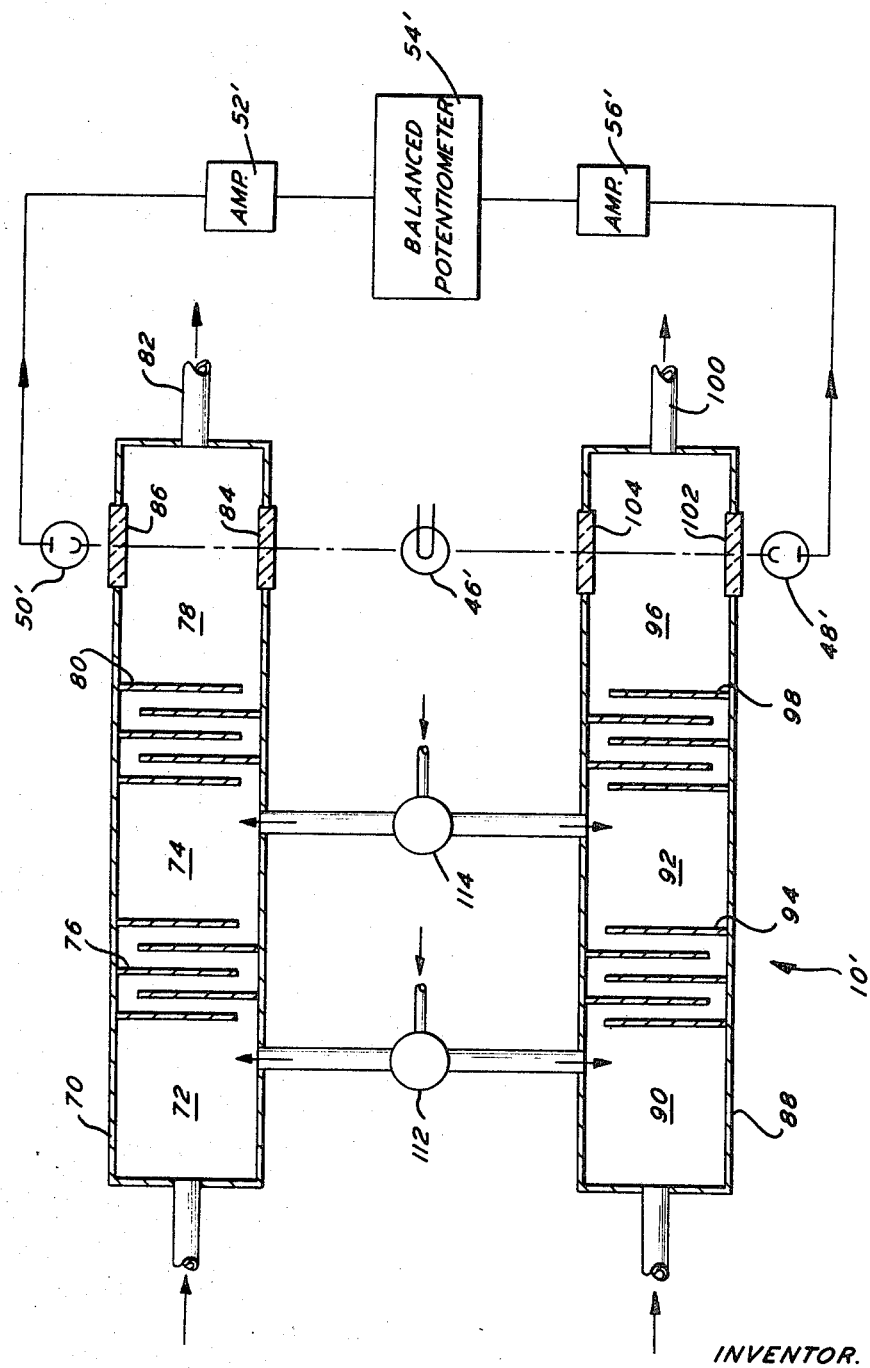

United States Patent Office 3,436,188
Patented Apr. 1, 1969

3,436,188
APPARATUS AND METHOD FOR DETECTION OF ALIPHATIC HYDROCARBON IN WATER
Charles A. Boyd and Herbert Kartluke, West Chester, Pa., assignors to Aeroprojects Incorporated, West Chester, Pa., a corporation of Pennsylvania
Filed Aug. 17, 1965, Ser. No. 480,454
Int. Cl. G01n 29/02, 9/00
U.S. Cl. 23—230
15 Claims

ABSTRACT OF THE DISCLOSURE

Method and apparatus for detecting the presence of aliphatic hydrocarbons in a body of water. The body of water is separated into two samples, ultrasonic cavitation is induced in one of the samples to form hydrogen and hydroxyl ions and a compound between the aliphatic hydrocarbon and the hydroxyl ions. Such compound is then reacted with a reagent to form a reaction product. The amount of hydrocarbon in the body of the water is then determined by comparing the reaction product of one sample with the other, or detecting the amount of hydrogen ions.

---

This invention relates to apparatus and method for detection of aliphatic hydrocarbon in water, and more particularly to the quantitative detection of such hydrocarbon. The body of water containing the aliphatic hydrocarbon may be a static supply or may be a flowing stream.

In accordance with the present invention, a portion of the water thought to contain aliphatic hydrocarbon is removed and diverted into two paths each containing a sample of the liquid. One of the samples is subjected to ultrasonic cavitation. The cavitation thereof will generate hydrogen and hydroxyl ions.

Thereafter, a reagent is added to each sample. The reagent added may be chosen so as to detect directly or indirectly the presence of an unbalance of hydrogen or hydroxyl ions in the sample which was subjected to cavitation. Thereafter, the samples may be subjected to a photocolorimeter test to determine the optical density of the samples. If the optical densities are identical, no aliphatic hydrocarbon was present in the liquid. If the optical densities are not identical, the presence of aliphatic hydrocarbon in the liquid is indicated. By use of known photocolorimeters, such as one which uses an initially balanced potentiometer, the amount of aliphatic hydrocarbon may be readily ascertained. In accordance with the present invention, aliphatic hydrocarbon concentrations as low as one hundred parts per million may be quantitatively detected.

It is an object of the present invention to provide novel apparatus for detecting the presence of aliphatic hydrocarbon in water.

It is another object of the present invention to provide a novel method for detecting the presence of aliphatic hydrocarbon in water.

It is another object of the present invention to provide novel apparatus and method for detecting the presence of aliphatic hydrocarbon in water.

It is another object of the present invention to provide novel apparatus and method for detecting the presence of aliphatic hydrocarbon in a continuously moving stream of water.

It is another object of the present invention to provide novel apparatus and method for quantitatively detecting low concentrations of aliphatic hydrocarbon in water in a manner which is simple, inexpensive, accurate and reliable.

It is still another object of the present invention to provide apparatus and method utilizing ultrasonics for the quantitative detection of aliphatic hydrocarbon in water.

Other objects will appear hereinafter.

The present invention uses ultrasonic cavitation upon a mixture of water and aliphatic hydrocarbon to produce hydroxyl ions and to oxidize aliphatic hydrocarbon to a carboxylic acid or ketone which is then detected quantitatively, as by a colorimetric reaction. For quantitative detection the oxidation should be sufficient to convert any alcohol or aldehyde, to the carboxylic acid, or in the case of a branched chain hydrocarbon any alcohol to a ketone.

For the purpose of illustrating the invention, there are shown in the drawings forms which are presently preferred; it being understood, however, that this invention is not limited to the precise arrangements and instrumentalities shown.

FIGURE 2 is a schematic flow diagram illustrating another embodiment of the present invention.

Figure 1:
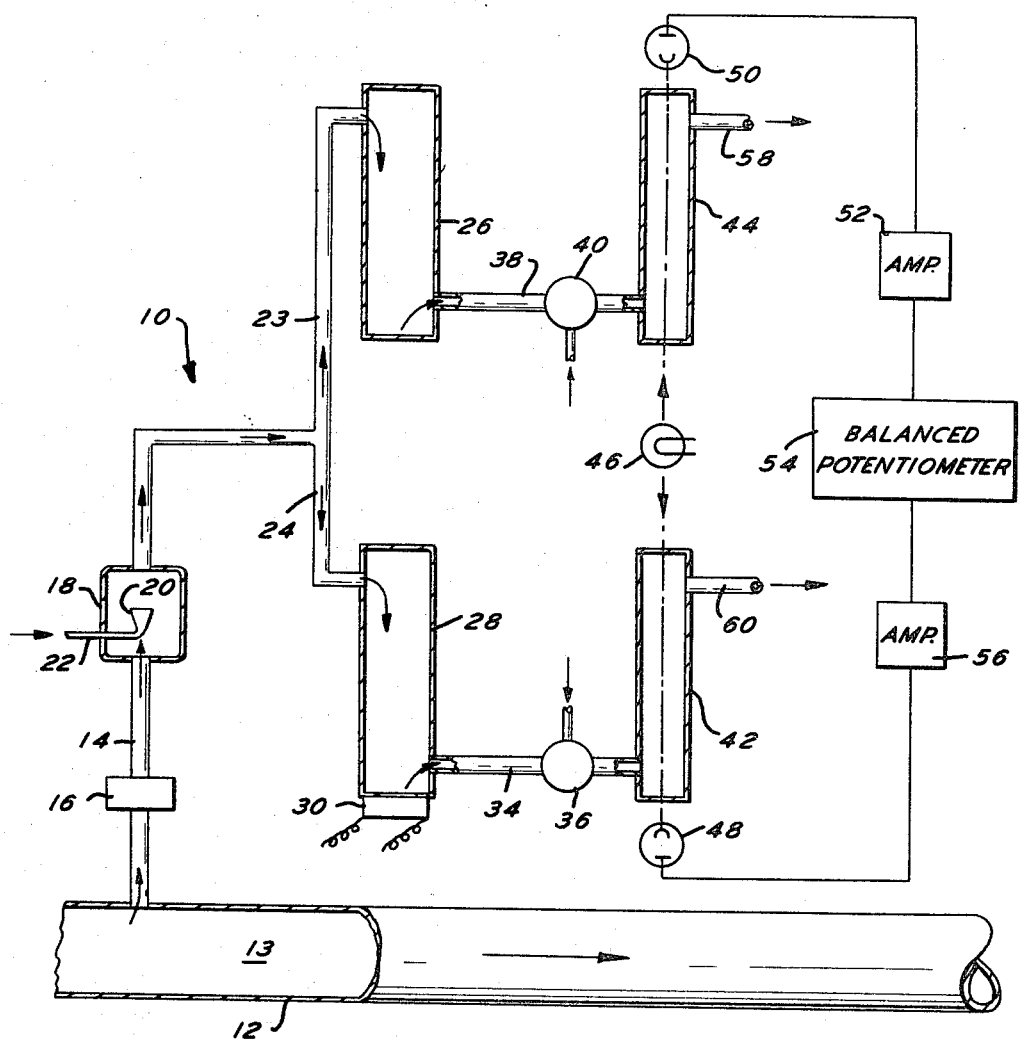
FIGURE 1 is a schematic flow diagram illustrating one embodiment of the present invention.

Referring to the drawing in detail, wherein like numerals indicate like elements, there is shown in FIGURE 1 a schematic illustration of detection apparatus in accordance with the present invention designated generally as 10. While the present invention is clearly adaptable for use with a static body of liquid, the description hereinafter relates to use of the present invention in connection with detection of aliphatic hydrocarbon in a continuously moving stream. The apparatus of the present invention may be used to monitor marine overboard discharges in order to comply with the resolutions of the International Convention on Prevention of Pollution of the Sea by Oil, 1962, as amended and ratified.

For purposes of illustration of the present invention, there is illustrated in FIGURE 1 an environment wherein the apparatus 10 is coupled to a conduit 12 or other enclosure containing a continuously moving stream 13 comprising water. A portion of the water 13 is diverted through conduit 14 containing a filter 16. Filter 16 filters out solid contaminants. If the apparatus 10 is mounted on a sea-going vessel, the stream 13 will represent the sea and a pump may be utilized to cause the water 13 to move through conduit 14.

The conduit 14 includes an aeration chamber 18. A conduit 22 is adapted to be coupled to a source of air under pressure and has a discharge nozzle 20 disposed within chamber 18.

The conduit 14 communicates with branch conduits 23 and 24, which receive the entirety of the fluid flowing through conduit 14. Conduit 23 discharges the fluid into a dummy cell 26. Conduit 24 discharges the fluid into a cavitation cell 28. Thus, by way of conduits 23 and 24 the water 13 has now been diverted into two flow paths thereby providing two separate samples.

A means such as ultrasonic transducer 30 is provided to induce cavitation in the liquid sample as it flows through the cell 28. Cavitation has been defined as a generic term applied to a number of ultrasonic effects characterized by the formation and collapse of bubbles in a liquid. Of all of the phenomena associated with the passage of an intense soundwave through a liquid, the production of cavitation is probably the widest known, but at the same time the least understood. Cavitation seems to be basically of two types, namely bubbles filled with a gas which is in the liquid and bubbles filled with a vapor of the liquid. The former appear at lower power levels and do not have the effects which the latter do.

The effect of cavitation on the water 13 desired by the present invention is the generation of hydrogen and hydroxyl ions in accordance with the following reaction:

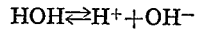

The hydroxyl ions may combine with each other to form $H_2O_2$ in accordance with the following reaction:

$$OH^- + OH^- \rightleftharpoons H_2O_2$$

However, the hydroxyl ions may also react as OH radicals when any hydrocarbon is present as follows:

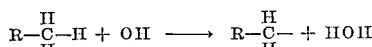

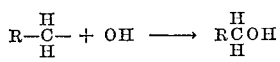

The alcohol R—O—H is further oxidized to aldehydes (or in the case of branched chain hydrocarbons to ketones):

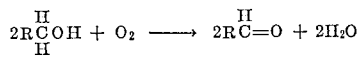

Thus, it will be seen that the OH radical will form an alcohol with the hydrocarbons present. The alcohol is then oxidized to form a carbonyl compound such as an aldehyde or ketone. For qualitative detection, the aldehyde can be detected as by colorimetric or precipitative techniques.

For quantitative detection the oxidation of the aldehyde should be continued until it becomes a carboxylic acid, and then the amount of carboxylic acid can be quantitatively analysed. Ketones can be quantitatively analysed.

The aliphatic hydrocarbons, or cycloparaffins, or olefins, or mixtures thereof, which form ketones or carboxylic acids, may be detected by the present invention. Examples include hexane, heptane, octane, nonane, decane, and their isomers, cyclohexane, naphthenes, pentenes, hexenes, octenes, naptha, gasoline, kerosene, gas oil, lubricating oil, etc.

The aliphatic hydrocarbons of this invention also include aryl derivatives of aliphatic hydrocarbons such as toluene, orthoxylene, mesitylene, ethylbenzene, ethyltoluene, cumene, n-propyl benzene, etc., in which the aliphatic portion of the molecule may undergo oxidation, as by way of example toluene into benzoic acid.

The sample passing through cell 26 discharges therefrom by way of conduit 38. Conduit 38 contains a reagent addition housing or the like 40. The sample passing through cell 28 discharges by way of conduit 34. Conduit 34 contains a reagent addition housing or the like 36. Any reagent added to housings 40 and 36 will mix with the samples flowing therethrough. Equal amounts of reagent are added to the samples from the housings 36 and 40.

Thereafter, the samples are fed to a photocolorimeter. The photocolorimeter includes a pair of optical cells 42, 44 each of which receive one of the samples. The optical cells may be made from an opaque material having transparent windows at its opposite ends or alternatively may be made from a transparent material. A light source 46 is disposed between the cells 42 and 44.

A photoelectric cell 48 is positioned to receive optical radiation in the form of an electromagnetic wave from light source 46. A photoelectric cell 50 is likewise disposed and associated with the cell 44. Cell 48 is coupled by way of a conductor through an amplifier 56 to a normally balanced potentiometer 54 or equivalent. Likewise, cell 50 is coupled by way of a conductor through an amplifier 52 to potentiometer 54. The samples are continuously discharged from the cells 42 and 44 by way of conduits 60 and 58 respectively.

The discharge of air into the aeration chamber 18 assures the presence of sufficient oxygen with the amount of cavitation that is present for oxidation of the alcohol to a ketone or a carboxylic acid. The transducer 30 may be an ultrasonic transducer of the magnetostrictive type, piezoceramic type, or any other equivalent thereof. A wide variety of transducers for inducing cavitation in cell 28 are well known to those skilled in the art.

EXAMPLE I

The reagent added to housing 36 and 40 was Schiff's reagent. The color of the sample in cell 42 was a crimson color indicating the presence of a carbonyl compound, namely a ketone. (All hydrocarbon present was branched chain.) The color of the sample in cell 44 was substantially colorless. The difference in color was detected by the signals transmitted to the normally balanced potentiometer. Thereafter, the potentiometer was balanced and the amount of hydrocarbon in the liquid may be ascertained in parts per million.

EXAMPLE II

The above process was repeated with the reagent being Fehling's reagent, a solution of a copper salt in tartaric acid which has been made alkaline. The reagent reacted with the sample in cell 42 to form a reddish brown precipitate indicating the presence of a ketone. The sample in cell 44 was substantially colorless. Thereafter, the amount of hydrocarbon in parts per million may be ascertained in a conventional manner.

Thus, it will be noted that the optical density of the samples may be compared by a color test or by generation of a precipitate. The presence of the organic acid may also be detected by the electrical conductivities of the samples or by the measurement of the small pH change due to the difference in acidity.

A wide variety of reagents for detecting carbonyl compounds colorimetrically or by the formation of precipitates are known in the art, and may be used in the subject invention. No claim is made respecting any particular reagent.

In FIGURE 2, there is illustrated another embodiment of the present invention wherein the apparatus is designated generally as 10'. The apparatus 10' is identical with the apparatus 10 except as will be made clear hereinafter. Accordingly, corresponding elements are provided with corresponding primed numerals.

As indicated above, the inducement of cavitation in one of the samples provides a reversible reaction wherein water is converted to hydrogen and hydroxyl ions. The description with respect to apparatus 10 proceeds on the detection of the hydrocarbon as a function of reactions associated with the OH radical. The apparatus 10' proceeds with the detection of hydrocarbon on the basis of presence or reactions with the hydrogen ion.

The apparatus 10' includes a manifold 70 having mixing chambers 72 and 74 separated by staggered baffles 76. Manifold 70 also includes a third chamber 78 separated from chamber 74 by staggered baffles 80. The chambers 72, 74 and 78 are in series.

The manifold 70 receives a sample from the dummy cell (dummy cell 26 of FIGURE 1). Manifold 70 is provided with an outlet discharge conduit 82. Adjacent conduit 82, the manifold 70 is provided with transparent windows 84 and 86.

A second manifold 88 is provided to receive the sample in which cavitation was induced, namely from cavitation cell 28. Manifold 80 includes chambers 90 and 92 separated by staggered baffles 94. Manifold 88 also includes chamber 96 separated from chamber 92 by staggered baffles 98. The chambers 90, 92 and 96 are in series. Manifold 88 is provided with an outlet discharge conduit 100. Transparent windows 104 and 102 are provided in the manifold 88 adjacent the conduit 100.

A light source 46' is provided in a position so that electromagnetic waves may be radiated through the windows to the photoelectric cells 48' and 50'. The electrical signals generated by the cells 48' and 50' may be detected and compared as described above.

A first metering pump 112 is provided in a position so that it may discharge a reagent into chambers 72 and 90. A second metering pump 114 is provided so that it may discharge a reagent into chambers 74 and 92. The pumps are preferably micro-proportioning pumps.

If there are any hydrocarbons present in the samples, the hydrocarbons in the sample subjected to cavitation will react with the OH radicals thereby leaving hydrogen ions. The apparatus 10' proceeds to detect the presence of the free hydrogen ions and thereby indicate that hydrocarbons are present in the samples.

EXAMPLE III

Pump 112 is used to introduce a controlled amount of nickel biuret into the chambers 72 and 90. The nickel biuret mixes instantly with the liquid sample as a result of the baffles 76 and 94. In a chemical equilibrium, where nickel biuret is dissolved in water, the nickel ion concentration is so low that there is no precipitation of nickel hydroxide. The addition of dimethylglyoxime has no effect. When the sample has free hydrogen ions as a result of the cavitation treatment, nickel ions are released from the nickel biuret.

Dimethylglyoxime is pumped by pump 114 into chambers 74 and 92. The dimethylglyoxime is now free to combine with the nickel ions to produce a red color in the sample in chamber 92. The chemical reactions involved are as follows:

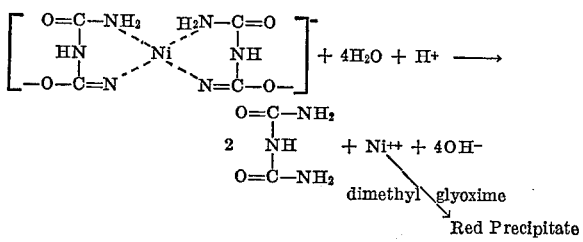

The respective samples then flow to the end of the manifolds 70 and 88 to the discharge conduit. The transmission of electromagnetic waves through the windows and the respective sample enables the photocells 50' and 48' to generate signals as a function of the optical density of the samples.

Thereafter, the process is the same as set forth above with the previously discussed examples wherein the amount of hydrocarbons are detected as a function of the optical density of the respective samples.

EXAMPLE IV

This example is based on the liberation of iodine from a mixed solution of potassium iodide-iodate by acidic compounds. The presence of free iodine is detected by the blue color produced in the presence of starch. The intensity of the blue color is a measure of the acidic compounds and the amount of hydrocarbon originally present in the sample.

In this example, the testing procedure is the same as in Example III except as follows: Pump 112 introduces potassium iodide-iodate into chambers 72 and 90. A starch solution is introduced by pump 114 into chambers 74 and 92. The starch iodine complex formed in chamber 92 and intimately mixed as a result of the baffles 98 has a dark blue color. The blue color of the sample in manifold 88 is readily detected by the photocolorimeter and a signal is generated in the same manner as described above.

In connection with each of the above-described examples, the cavitation of the water forms a carbonyl compound and free hydrogen ions. Examples I and II detect the presence of hydrocarbons by introducing a reagent which will react with the carbonyl compound. Examples III and IV introduce a reagent which will react with the hydrogen ion rather than the carbonyl compound.

The present invention may be embodied in other specific forms without departing from the spirit or essential attributes thereof and, accordingly, reference should be made to the appended claims, rather than to the foregoing specification as indicating the scope of the invention.

We claim:

1. A method of detecting the presence of aliphatic hydrocarbon in a moving body of water comprising the steps of diverting a portion of a body of water into two separate samples, inducing ultrasonic cavitation in one of the samples, and then comparing the concentration of acidic compounds in said one sample with the other sample to detect the amount of hydrocarbon in the body of water.

2. A method in accordance with claim 1 wherein said detecting step includes adding a reagent to said one sample to produce acidic compounds capable of being detected by a photocolorimeter.

3. A method of detecting the presence of aliphatic hydrocarbon in a body of water comprising the steps of diverting a portion of the water, separating said portion into two samples, subjecting one sample to ultrasonic cavitation to separate a portion of the water into hydrogen and hydroxyl ions, adding a reagent to each sample which will change the optical density of said one sample, comparing the optical density of the samples, and then generating an electrical signal indicative of the amount of hydrocarbons in said sample as a function of the optical density of said samples.

4. A method in accordance with claim 3 wherein said diverting step is accomplished continuously.

5. A method in accordance with claim 3 including the step of introducing air into the samples before said one sample is subjected to cavitation.

6. A method of detecting the presence of aliphatic hydrocarbon in a body of water comprising the steps of separating the body of water into two samples, inducing ultrasonic cavitation in one of the samples to form hydrogen and hydroxyl ions and to form a compound between the aliphatic hydrocarbon and the hydroxyl ions, introducing a reagent into each sample, reacting the reagent with a member selected from said compound and the hydrogen ions in said one sample to form a reaction product, and comparing the reaction product of said one sample and the other sample to detect the presence of the aliphatic hydrocarbon in the water.

7. A method in accordance with claim 6 wherein said detecting step includes passing light through the samples after the reagent has been added to the samples.

8. A method in accordance with claim 6 wherein the reagent will react to change the color of said one sample, and said detecting step includes comparing the optical densities of the samples to generate an electrical signal as a function thereof.

9. A method in accordance with claim 6 wherein said detecting step includes forming a precipitate in said one sample.

10. An apparatus for detecting the presence of aliphatic hydrocarbons in a body of water comprising a first conduit through which a sample portion of the water from a moving body of water may continuously flow, second and third conduits constituting sample flow paths communicating with said first conduit, means associated with said third conduit for ultrasonically inducing cavitation in water flowing through said third conduit, a separate reagent addition means in said second and third conduits, means for introducing an optical radiation through each sample in said second and third conduits, photoelectric means for detecting the optical densities of said samples in response to the passage of the radiation through the samples and for generating an electrical signal as a function of the optical densities, and potentiometer means for receiving the signals and comparing the same to ascertain the amount of hydrocarbons, if any, present in said sample moving through said third conduit.

11. Apparatus for detecting the presence of aliphatic hydrocarbons in a body of water comprising means for containing two separate samples of water in which it is desired to ascertain whether there are any aliphatic hydrocarbons present, means for inducing cavitation in one of the samples, means for introducing a reagent into each sample, and means for comparing the sample containing a reagent with the other sample and generating a signal indicative of the presence of hydrocarbons in said one sample.

12. Apparatus for detecting the presence of aliphatic hydrocarbons in a body of water in accordance with claim 11 including means for introducing air bubbles into each sample before said one sample is subjected to cavitation.

13. Apparatus for detecting the presence of aliphatic hydrocarbons in a body of water in accordance with claim 11 wherein said last-mentioned means is a photocolorimeter.

14. Apparatus for detecting the presence of aliphatic hydrocarbons in a body of water in accordance with claim 11 wherein said first means includes a chamber device having an inlet and an outlet through which the samples may continuously flow.

15. Apparatus for detecting the presence of aliphatic hydrocarbons in a body of water in accordance with claim 11 wherein said third-mentioned means includes manifolds having spaced inlet and outlet ports through which the samples may continuously flow, and said manifolds being internally divided into chambers in series.

References Cited

UNITED STATES PATENTS 1,977,359   10/1934   Styer ---------------- 23—230
2,977,199   3/1961   Quittner.

OTHER REFERENCES

Schmitt et al., J. Amer. Chem. Soc., 51, pp. 370–375 (1929).

Liv et al., J. Amer. Chem. Soc., 56, pp. 1005–1007 (1934).

Weissler, A., J. Acoustical Soc. of Amer., 25, pp. 651–657 (1953).

MORRIS O. WOLK, *Primary Examiner.*

R. M. REESE, *Assistant Examiner.*

U.S. Cl. X.R.

23—253; 204—158; 250—218